(12) United States Patent
Clark et al.

(10) Patent No.: US 7,102,824 B2
(45) Date of Patent: Sep. 5, 2006

(54) OPTICAL ELEMENT FOR EFFICIENT SENSING AT LARGE ANGLES OF INCIDENCE

(75) Inventors: Roy Clark, Thousand Oaks, CA (US); Douglas C. Hamilton, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 10/844,882

(22) Filed: May 13, 2004

(65) Prior Publication Data

US 2005/0254129 A1    Nov. 17, 2005

(51) Int. Cl.
*G02B 5/18*  (2006.01)

(52) U.S. Cl. ............... 359/571; 359/566; 359/831; 359/833; 257/436

(58) Field of Classification Search ........ 359/569–571, 359/566, 573–575, 831, 833, 837, 504, 565; 250/559.15; 257/436; 356/225

See application file for complete search history.

(56) References Cited

U.S. PATENT DOCUMENTS

| | | | |
|---|---|---|---|
| 4,989,972 A * | 2/1991 | Braun | ............... 356/225 |
| 5,551,042 A | 8/1996 | Lea et al. | |
| 5,604,607 A | 2/1997 | Mirzaoff | |
| 5,701,008 A | 12/1997 | Ray et al. | |
| 5,790,305 A | 8/1998 | Marcellin-Dibon et al. | |
| 5,900,973 A * | 5/1999 | Marcellin-Dibon et al. | . 359/487 |
| 5,952,645 A * | 9/1999 | Wang et al. | ......... 250/208.1 |
| 6,449,098 B1 | 9/2002 | Helkey et al. | |
| 6,452,872 B1 | 9/2002 | Teijido et al. | |
| 6,473,232 B1 | 10/2002 | Ogawa | |
| 6,473,238 B1 | 10/2002 | Daniell | |
| 6,476,968 B1 | 11/2002 | Kato et al. | |
| 6,493,143 B1 | 12/2002 | Kato | |
| 6,498,353 B1 | 12/2002 | Nagle et al. | |

(Continued)

FOREIGN PATENT DOCUMENTS

FR    2733062    10/1996

OTHER PUBLICATIONS

Babcock, "Diffraction gratings at the Mount Wilson Observatory," Physics Today pp. 34-42 (1986).
Jenkins, et al., "Fundamentals of Optics," Chapter 25, McGraw Hill, Ny, NY (1976).

(Continued)

*Primary Examiner*—Leonidas Boutsikaris
(74) *Attorney, Agent, or Firm*—Marshall Gerstein & Borun LLP

(57) ABSTRACT

An optical element is provided that may be used for collecting optical radiation incident at large angles of incidence. The element may include a grating window formed of grating elements that may collect large incident angle radiation and reflect that radiation, e.g., under total internal reflection in a substantially normal direction. A lens or lens array may be used to collect the internally reflected radiation and focus that radiation to a detector. Example detectors include infrared detectors. The element may be formed to collect, reflect, and redirect optical radiation incident at angles above 45° as measured from a surface normal to a detector oriented substantially at normal incidence. The detected signal from the optical element may be used to control systems within an aircraft or other vehicle capable of flight. In another application, the optical element may also be used to project optical radiation at the same large angles by replacing the detector elements with light sources, such as light emitting diodes.

60 Claims, 12 Drawing Sheets

U.S. PATENT DOCUMENTS

| | | |
|---|---|---|
| 6,504,649 B1 | 1/2003 | Myers |
| 6,510,263 B1 | 1/2003 | Maisenholder et al. |
| 6,606,133 B1 | 8/2003 | Okabe |
| 2005/0094295 A1* | 5/2005 | Yamashita et al. .......... 359/833 |

OTHER PUBLICATIONS

Welford, et al., "High Collection Nonimaging Optics," Academic Press, San Diego, CA (1989).

* cited by examiner

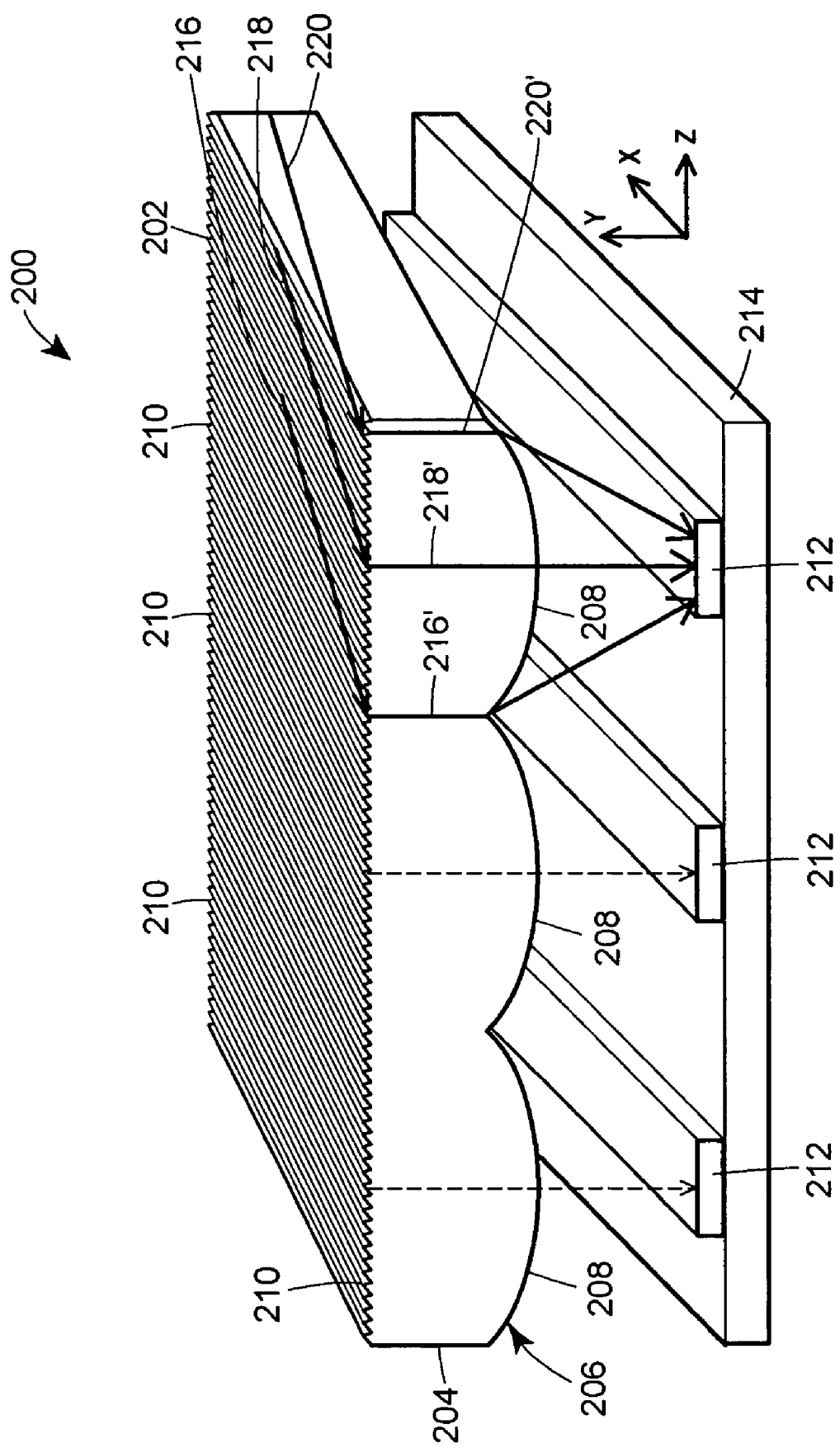

OPTICAL ELEMENT FOR EFFICIENT SENSING AT LARGE ANGLES OF INCIDENCE

FIELD OF THE INVENTION

The present disclosure generally relates to optical elements and, more particularly, to low profile optical elements capable of collecting optical radiation at large angles of incidence relative to the surface normal of the first optical element and delivering such optical radiation to an optical sensor located at near-normal incidence relative to the same first optical surface.

BACKGROUND OF THE RELATED ART

Optical sensors employ optical elements that are used in the collection of optical radiation and direct such collected optical radiation to an optical sensor element for measurement of sensor specific characteristics based on that collection. To collect such incident optical radiation, optical sensors typically use an optical window or lens as the initial optical element, although other optical elements may be incorporated between the window and the sensor element. A window generally acts as a barrier to protect the following optics from adverse environments, such as excess temperature or pressure. The optical surfaces of the window are flat and may be parallel, or tilted at a slight angle relative to each other to form an optical wedge. A window with parallel optical surfaces does not change the divergence angle of the incident optical radiation. An optical wedge will slightly change the direction of incidence and the divergence angle of the incident optical radiation. Additionally, one or both of the optical surfaces of a lens are curved and act to change the divergence angle of the incident optical radiation to effectively direct the incident radiation onto the active area of the sensor.

Optical elements are most commonly used for collecting axial optical radiation, i.e., optical radiation incident over a range of angles near the axis of the surface normal of the initial optical element. In many optical sensor applications, this angular extent is limited by the acceptance angle of conventional optical elements. Such optical elements are typically limited to an acceptance angle of about 30° (half cone angle). In optical terms this represents a numerical aperture of about 0.5, defined as the sine of the half cone angle, or an f number of approximately 1, where the diameter of the optical element equals its focal length. In some sensor applications, however, it is desirable to have optical elements that are able to detect non-axial, i.e. off-axis radiation at large angles of incidence, for example from 60 to 80°. This is difficult using conventional optical elements.

When optical radiation is incident on an optical window element at large angles of incidence, although the angle of incidence is reduced inside the window element, as prescribed by Snell's Law, the exit angle of the optical radiation is the same as the incident angle. This means that sensors placed behind a planar window must be oriented so that the sensor element surface normal is parallel to the optical axis of the incident optical radiation. And, in practical sensor applications, such placements lead to unacceptably large packaging volumes, especially when multiple sensors are employed.

Another problem with the use of conventional optical elements at large angles of incidence is Fresnel reflection. As is well-known, Fresnel reflections cause a loss of transmitted radiation at transmissive surfaces due to a reflection from the same surface that increases in magnitude as the angle of incidence increases. For materials of higher refractive index, such as semiconductor materials, these Fresnel reflections can result in sizeable losses of optical radiation. As a result of the foregoing, optical sensor designers are limited in their ability to design effective off-axis optical radiation sensors.

Many types of optical radiation detector have small surface areas, and practical sensor designs usually require small packaging volumes. In conventional optical radiation configurations, this requires the use of a lens with a short focal length. Such lenses are also subject to Fresnel losses. Additionally, they introduce focusing errors such as large optical aberrations for optical radiation at high angles of incidence. These aberrations increase as the f number of the lens is decreased and as the refractive index is increased. This is especially true of semiconductor materials such as silicon or germanium that have extremely high refractive indices compared to air. These focusing errors can significantly reduce sensor performance and impact the effectiveness of the overall system to perform its intended function.

Large lenses with short focal lengths have an almost hemispherical shape. This makes them heavy and difficult to fabricate. Furthermore, in aircraft applications, weight and airflow disturbance considerations require a lens that is similar in profile to the immediate surface contour of the external vehicle. To address this, lenses with a faceted structure, known historically as Fresnel lenses have been used. If such facets are configured to be linear, a cylindrical Fresnel lens is formed that acts in a similar fashion to a conventional cylindrical lens. A collimated beam incident along the optical axis of the lens is bought to a line focus. If, instead, the facets are configured in a circular pattern, a spherical Fresnel lens is formed that acts in a similar fashion to a conventional spherical lens. A collimated beam incident along the optical axis of the lens is bought to a point focus.

These generally flat lenses collect substantially axial radiation, i.e., radiation over an angular sensitivity range that includes a surface normal, and use that collected radiation for imaging or illumination purposes. Some have recently proposed Fresnel lenses that include binary optical structures formed of discrete steps, which may be formed via photomasking techniques. Yet, these Fresnel lens share operation and design with the other classes of lens. They are designed for collection of axial or near axial radiation, not off-axis radiation collection. Other grating structures have been proposed, including diffraction gratings, for example, and large-scale plastic grating structures. But such structures operate by refraction and exhibit some of the alignment and distortion phenomena discussed above, especially for off-axis radiation.

Others have suggested the use of discrete microprisms for side illumination in instrument displays. But, the radiation in such structures is deflected by a complex arrangement of prisms that makes uniform collection and transmission of light over a sensing area very difficult. Further, the microprism structures are not periodic structures.

There have also been suggestions for arrays of microlenses, in applications such as micro-scale chemical analysis, fiber optic coupling and stereoscopic displays. These are imaging-type optical elements that operate by refraction and, as a result, can exhibit losses and distortions compared to the ideal, desired operation. Non-imaging microstructures have also been suggested for light concentration onto detector arrays using reflective devices, but again the devices are designed to collect light incident substantially on axis, not off axis. Plus, these structures do not focus light and may direct light back out of the collection aperture at large angles of incidence.

Combinations of diffraction gratings and lenses have also been proposed to correct for the chromatic aberration of conventional lens in applications such as photography, image projection and telescopes. But there is no capability to collect off-axis radiation, as they are limited to axial collection.

None of the various known optical elements are able to effectively collect off-axis, especially near grazing incidence, light in a low-loss system. Either from limitations on the angles of the light that can be collected or from the losses that affect that light once collected (e.g., Fresnel reflections), these optical elements present design limitations to sensor manufacturers.

SUMMARY OF THE INVENTION

An embodiment of the invention is an optical device comprising a substantially planar grating layer formed of a plurality of grating elements, each grating element having an entrance face forming a first angle with a surface normal of the planar grating layer, the entrance face positioned for receiving off-axis radiation, and a reflection face forming a second angle with the surface normal and positioned to reflect the off-axis radiation in a direction substantially aligned with the surface normal and under total internal reflection; at least one lens for focusing the reflected obliquely incident light onto a focal plane; and at least one photo-detector positioned to receive the reflected light at the focal plane.

Another embodiment of the invention is an optical element comprising a substantially planar grating layer having a plurality of grating elements disposed to reflect radiation incident upon the grating layer at an off-axis angle of incidence into a substantially normal direction under total internal reflection; and at least one focusing element aligned along the substantially normal direction for focusing the reflected radiation to a focal plane.

A further embodiment of the invention includes a method of sensing radiation at an off-axis angle of incidence. The method includes forming a plurality of grating elements having an entrance face and an internal reflection face, wherein the entrance face accepts radiation at the off-axis angle of incidence and wherein the internal reflection face reflects the radiation in a direction substantially aligned with a surface normal and under total internal reflection; focusing the reflected radiation onto a focal plane; and detecting radiation at the focal plane.

Another embodiment of the invention is an illumination device comprising a light source producing a light energy; a lens positioned to collect the light energy and provide a substantially normal light energy; and a substantially planar grating layer positioned to receive the collected light energy, the substantially planar grating formed of a plurality of grating elements, each grating element having a reflection face forming a first angle with a surface normal of the planar grating layer and positioned to reflect the substantially normal light energy under total internal reflection onto an exit face forming a second angle with the surface normal, wherein the exit face is positioned to provide off-axis radiation.

Some embodiments provide an optical element that may be used in the detection of radiation incident on a surface at a large angle of incidence. A grating window may be used for the radiation collection. The size and dimensions of grating elements on that window may be adjusted to direct light collection to a desired range of incident angles and the elements may be formed to allow for collection of light from different ranges of incident angles, for example by having the elements formed to collect forward- and backward-incident radiation. The grating layer may collect light and reflect it under a substantially lossless total internal reflection to a detector region.

In addition to adjusting grating size and pattern to affect a desired range of acceptable incident angles, a lens may be provided on the optical element, at a size that is suitable to match the sensitivity of a detector or other analysis tool. Furthermore, different lenses or lens sizes may be employed to create a desired resolution over the detected area. Microlenses may be used and patterned in an array form, for example, to allow for 2-dimensional resolution of the collected radiation.

The techniques for sensing radiation at large angles of incidence can be used in any number of environments, of which aircraft-based sensing is an example. The optical element may be positioned flush with an aircraft skin, i.e., an outer layer, to detect large angle of incidence radiation near that skin. For creating a mechanical, electrical, or other response to such detected radiation, the optical element may be coupled to a controller capable of controlling connected systems, such as actuator-based flight control systems on an aircraft. Thus the aircraft may have subsystems responsive to the detection of large angle of incidence radiation, in an example.

The features, functions, and advantages can be achieved independently in various embodiments of the present inventions or may be combined in yet other embodiments.

BRIEF DESCRIPTION OF THE DRAWINGS

FIG. 2 illustrates a partial front view of a detailed example of the large angle of incidence optical element of FIG. 1.

DETAILED DESCRIPTION OF AN EXAMPLE

Numerous exemplary devices and techniques are described below. Some of the devices and techniques are described in relation to somewhat specific environments of use. The devices and techniques are not limited to such uses, however, but rather may be implemented in various ways. For example, although some examples are described as usable in an aircraft, the devices and techniques may be used in any number of flight-capable and other vehicles. Furthermore, the devices and techniques may be used, more broadly, in any environment in which collection or projection of off-axis optical radiation may be desired, this may include environments where on-axis radiation collection or projection is desired as well. Many other examples will be known to persons of ordinary skill in the art upon reviewing the disclosure herein.

Figure 1A:
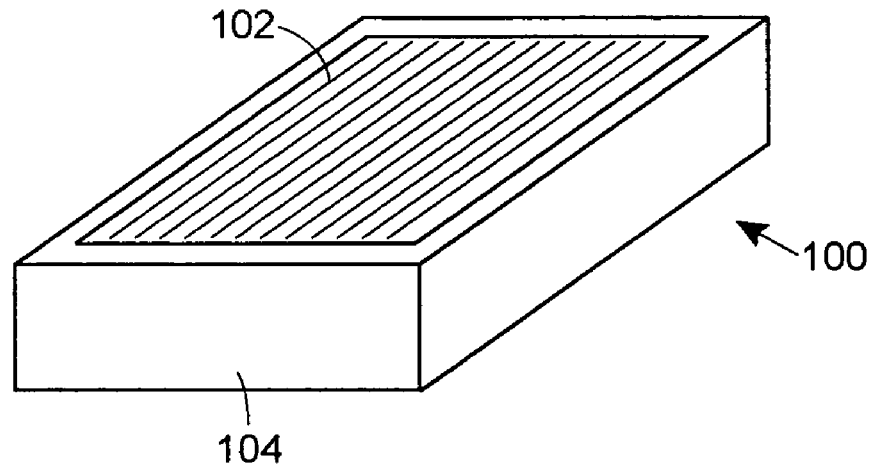
FIGS. 1A & 1B illustrate an optical sensor module having a large angle of incidence optical element, in accordance with an example.
Figure 1B:
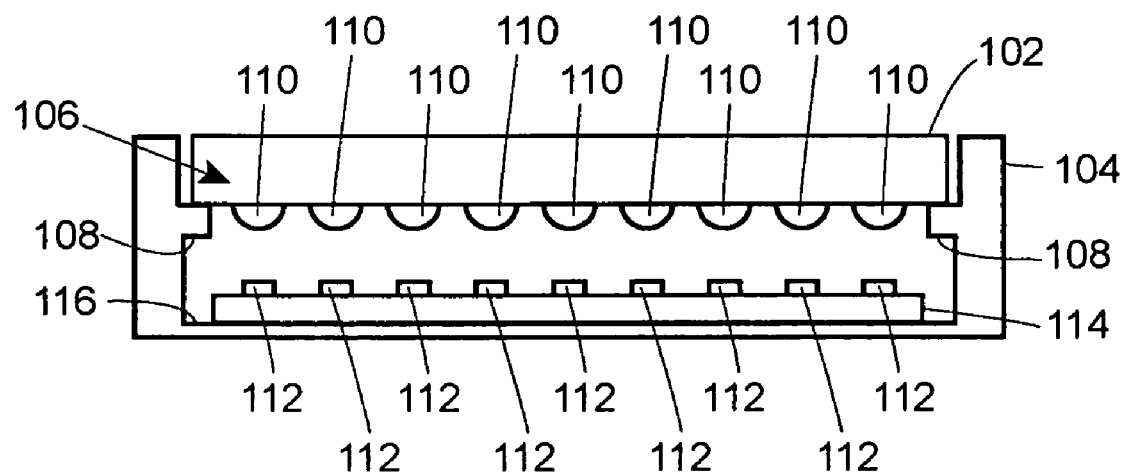

FIGS. 1A and 1B illustrate an optical module 100 that may be used to collect and detect off-axis optical radiation, such as radiation having a large angle of incidence, for example up to near grazing incidence. The module 100 may be used in an optical sensing application designed to exclusively collect such off axis radiation, or the module 100 may be used as part of a more general sensing application to extend the acceptance angles of incidence beyond just those that are substantially axial. The module 100 may be designed with a small form-factor, thus allowing it to be used in hostile environments, such as at the outer surface of an aircraft, where a material is exposed to extreme temperature and flow conditions.

The module 100 may include a planar optical window 102 resting in a housing 104 that may be formed of light-weight materials, such as aluminum, titanium, beryllium, or various plastics. As explained in further detail below, the planar optical window 102 may include a planar grating layer at its exposed surface. These materials are listed by way of example. In some examples, the housing 104 may be an environmentally sealed enclosure, such as a vacuum chamber.

As shown in cross-section in FIG. 1B. the window 102 may reside in a counterbore 106 extending above a terminus 108. The window 102 may be affixedly mounted to the terminus 108, via glue mounting, clamping, friction, or the like. In the illustrated example, and as described in further detail below, the window 102 may include a plurality of lenses 110 capable of focusing the collected off-axis radiation. A plurality of detectors 112 may be positioned below the lenses 110, in a one-to-one configuration. The detectors 112 may be mounted on a support substrate 114 that may provide structural support as well as thermal dissipation. The substrate 114 may be mounted to a floor 116 of the housing 104. This configuration is by way of example and then only partially illustrated, as the module 100 would provide electrical connection to the detectors 112 for driving and/or detecting a sensed characteristic of the collected radiation.

FIG. 2 illustrates an example optical element 200 that may be used in the optical module 100 of FIG. 1. The element 200 includes a substantially planar grating layer 202, which may be formed of materials such as zinc selenide, zinc sulfide, calcium fluoride, fused silica, sapphire, germanium, and gallium arsenide. The material should be transparent to the optical radiation in the wavelength range to be detected. Various plastics, like polycarbonate, acrylic and polyethylene, may also be used. And persons or ordinary skill in the art will appreciate that additional materials may be used. Below the planar layer 202 is a bulk region 204 that may be formed of an optically transparent material identical to that of the layer 202. The bulk region 204 is optional, however. Abutting the bulk region 204 is a focusing layer 206, which in the illustrated example, includes a plurality of cylindrically-extending focusing lenses 208.

Optical coatings may be used between the grating layer 202, bulk region 204, and focusing layer 206 to increase transmissivity and minimize boundary surface reflections. Coatings may also be used for wavelength region selection.

In the illustrated example, the layer 202 comprises a plurality of individual linear grating elements 210 (only a few bearing reference numerals), extending along an x-axis. The grating elements 210 can be formed in the bulk optical material used to form the layer 204 or in a separate optical material. Grating fabrication techniques are known and include, laser writing, photomask etching, and diamond cutting, milling, and extrusion. Additional techniques including stamping or rolling from a master grating template. The elements 210 are formed to collect off-axis radiation, even near grazing incidence radiation, and couple that radiation through the focusing layer 206 and to a plurality of detectors 212 formed on a substrate 214. For example, light rays, 216, 218 and 220 are incident upon the element 200 from a large off-axis angle, where the axis referred to is the y-axis as shown, which may also be considered a surface normal for the grating layer 204. The light rays may be incident from any off-axis angle, for example between about 45° and about 90°, i.e., near grazing incidence, as measured from normal. This range is provided by way of example.

This optical radiation (216, 218, and 220) enters the grating layer 202 and is turned through an angle larger than 90° so that it passes through the bulk region 204 substantially parallel to the y axis. The lens 208 then focuses the collected optical radiation 216', 218', and 220' onto the detector 212. Thus, the optical element 200 as shown is able to collect light over a range of off-axis incident angles and reflect that light in a substantially axial direction, perpendicular to the grating layer 202 for focusing onto a detector.

The thickness of the bulk region 204 may be determined by the mechanical requirements of the overall sensor structure. Factors include the material properties of the optical medium and the pressure differential between the regions above and below the layer 202. For example, if the optical element 200 is to be used above a vacuum sealed housing, then the thickness of the region 204 may be chosen to provide proper mechanical strength to withstand the differential pressure.

In the illustrated example, identical lenses 208 and detectors 212 are used, and each detector 212 is positioned a focal length distance from the corresponding lens 208. The focal length of the lenses 208 may be determined by the radius of curvature and refractive index of the optical material used to form the lens 206, each of which may be separately formed and mounted to bulk region 204. The material may be one of the materials identified above and may or may not be identical to that of the layer 204 or the layer 202. The selection of the radius and focal length of the lenses 208 may also depend upon design factors such as the size (along the z axis) of the detector 212 and the desired acceptance angle of the grating layer 202. Similarly, the width of the lens 208 is largely independent of the size of the grating elements 206, as the lens width is generally much greater than that the width of each grating element 210.

The detectors 212 may be visible, ultraviolet, or infrared detectors, for example, depending on the type of radiation to be collected by the window 102. Other wavelength ranges may be detected as well. Example materials for forming detectors will be known and include silicon, indium antimonide, mercury cadmium telluride, gallium arsenide, indium gallium arsenide, germanium, indium arsenide, lead sulfide, and lead selenide. The detectors 212 may be in a PIN configuration for example, i.e., is one with a p-type material/insulator/n-type material configuration. Persons of ordinary skill in the art will appreciate that numerous detector materials and configurations may be used.

Figure 3:
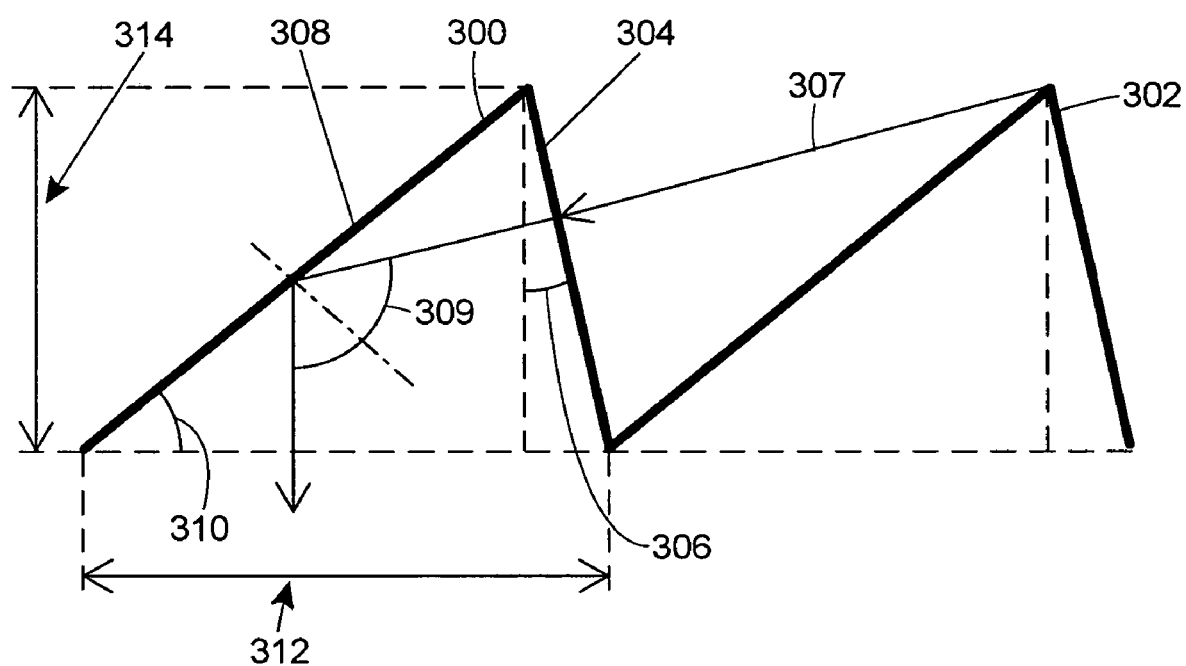
FIG. 3 an expanded view of example grating elements for the large angle of incidence optical element of FIG. 2.

FIG. 3 illustrates a detailed front view of example grating elements 300 and 302 (extending into the page) that may be used as the grating elements 210 of FIG. 2. The grating elements 300 and 302 may collect optical radiation incident over a range of off-axis incidence angles. The range of acceptable incident angles can vary depending on the geometry of the elements 300 and 302. Example ranges will now be discussed for explanation purposes, but persons or ordinary skill in the art will appreciate that geometries may be affected to collect any range of off-axis radiation below grazing incidence.

An optimum angle of incidence for a grating layer may be chosen by determining the center angle of the desired angular sensitivity range. For example, in FIG. 3, if it is desirable to detect optical radiation incident from 65° to 85°, as measured from the y (normal) axis, 75° is the chosen center angle. The range may represent $\Theta_{MIN}$ and $\Theta_{MAX}$, respectively, and the center angle $\Theta_C=(\Theta_{MIN}+\Theta_{MAX})/2$. As a result, in the illustrated example, a front facet 304, i.e., entrance face, of the first grating element 300 is set to be normal to radiation incident upon the grating layer at 75°. That is, an angle 306 is set to 15°, or 90°−$\Theta_C$. Optical radiation passes through the front face 304 into the element 300 and is incident upon a rear facet 308, e.g., a reflection face, which serves as a reflection surface.

The rear facet 308 may be angled to turn at least the optical radiation over the desired angular sensitivity range, i.e., between $\Theta_{MIN}$ and $\Theta_{MAX}$, over 90° so that the collected radiation is propagating substantially parallel to the y-axis. That is, an incident light ray 307 is reflected through a reflection angle 309 that is greater than 90°. In this manner, the collected light will be directed to a lens (not shown) that may collect light for focusing. To have the center angle radiation reflected off rear facet 308 into a normal direction, a rear facet angle 310 is set to half of the desired total turning angle $((90°−\Theta_C)+90°)/2$, which in the illustrated example is 52.5°. A grating pitch 312 or a height 314 may then determine the size of each facet face 304 and 308, once the angles 306 and 310 have been determined. The dimensions may be altered by using different fabrication techniques or settings and may depend on mechanical considerations of the particular environment of use. Grating pitches below 100 μm may be used. For example, the grating pitch may be set to 20 μm in certain applications.

The grating element 302 may be designed to have identical dimensions to that of grating 300. Alternatively, the element 300 and 302 may have different dimensions, and in such cases, a grating layer may be formed of a plurality of grating element pairs, each pair formed of a grating element 300 adjacent a grating element 302, for periodicity.

The grating device 300 may be designed such that reflections off of the rear facet 308 occur under the condition of total internal reflection. Although, the example of FIG. 3 illustrates total internal reflection for certain wavelengths from the geometries described above, these geometries are examples. The geometry of grating elements 300 and 302 is not limited to a particular wavelength range, angle, or material. The gratings may work at infrared, ultraviolet, and visible wavelengths, and all are included within the usage of "radiation" and "optical radiation" herein, along with other wavelengths, as would be appreciated by persons of ordinary skill in the art. The rear facet 308 may be coated with a reflective coating, e.g., a metallic or dielectric coating, to increase reflectivity in non total internal reflection geometries or improve reflection over any reflection condition, whether total or partial reflection.

By reflecting off-axis light in a normal or substantially normal direction, a lens may be used to focus the light onto a small detector or detector array without detrimental off-axis-induced aberrations and Fresnel reflections.

For the lenses in the optical sensor, the lens radius and width or diameter may be adjusted to match the size, spacing and acceptable angle of the associated detector. Other design factors, such as mechanical and space constraints may also be used. In an example optical element 400 shown in FIG. 4, a radius 402 of lens 404 was set to be twice a width 406 of the lens 404, for example, 2 mm in radius and 1 mm in width. In this configuration, the lens width is greater than the grating pitch. The radius 402 and width 406 determine the lens sag 408. Additionally, in the illustrated example, the radius 402 and width 404 are set to minimize or reduce total internal reflection at the lens surface 410, as this would result in Fresnel reflection-type losses for the element 400.

Figure 4:
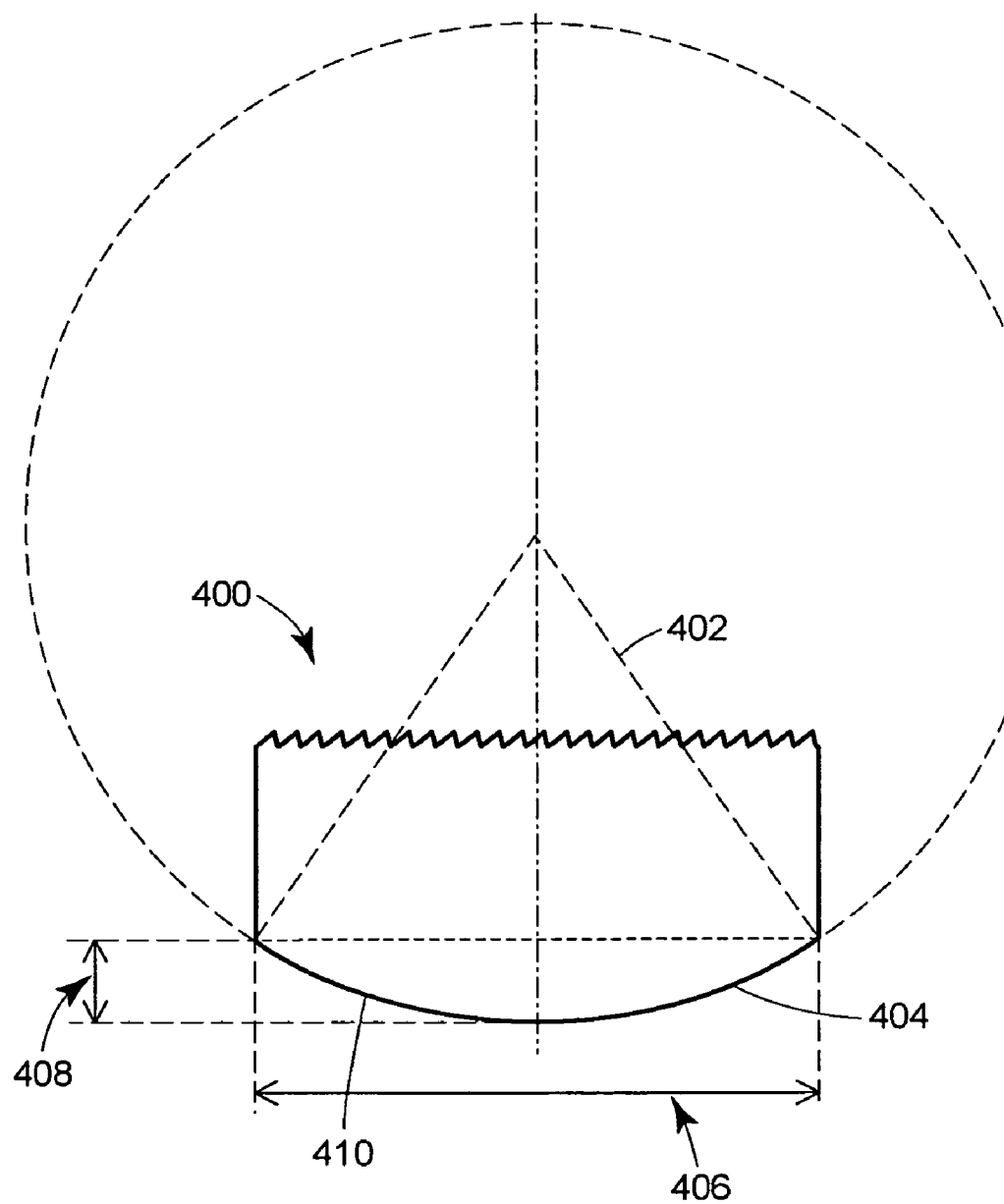
FIG. 4 illustrates a front view a large angle of incidence optical element, in accordance with an example.
Figure 5:
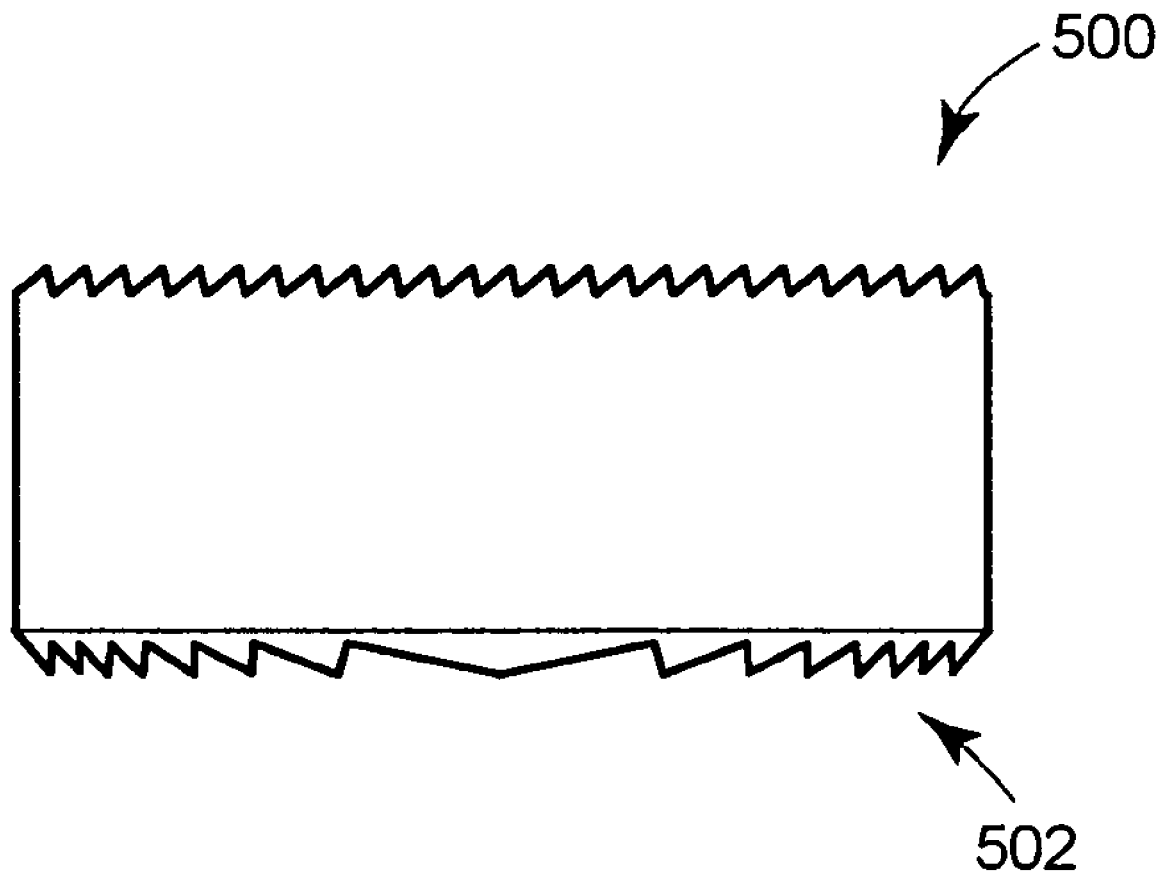
FIG. 5 illustrates a front view of a large angle of incidence optical element, in accordance with another example.
Figure 6:
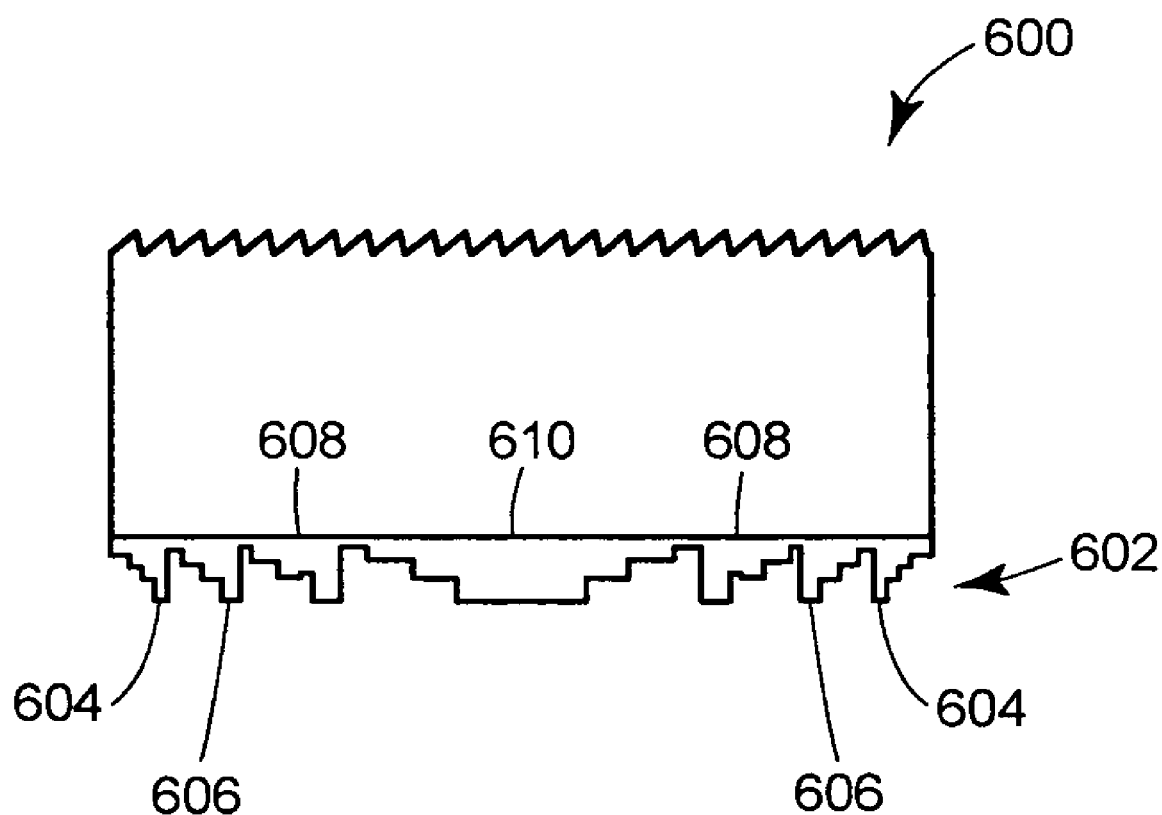
FIG. 6 illustrates a front view of a large angle of incidence optical element, in accordance with yet another example.
Figure 7:
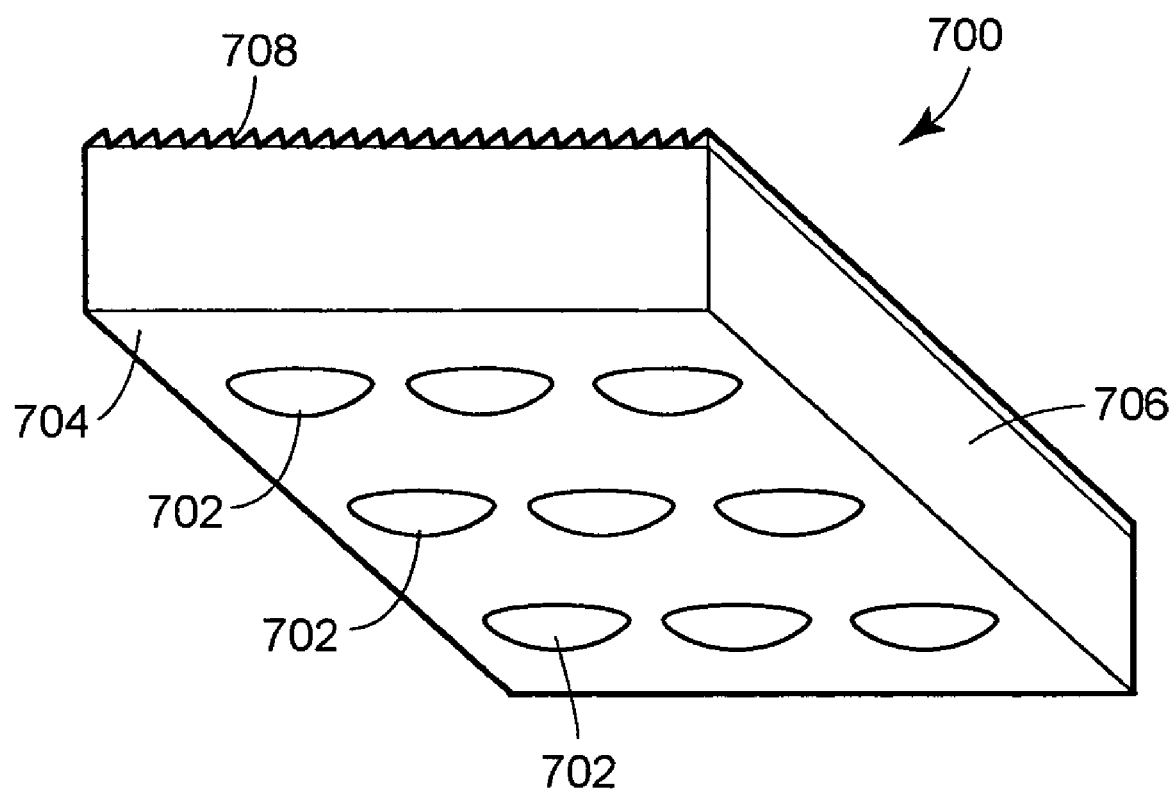
FIG. 7 illustrates yet another large angle of incidence optical element, in accordance with an example.

The lens 402 of FIG. 4 is a cylindrical lens. Other lenses may be used as shown in FIGS. 5–7. FIG. 5 illustrates the front view of an optical element 500 with a Fresnel contour lens 502 that may be a spherical lens or cylindrical lens. FIG. 6 is a similar illustration except with an optical element 600 that includes a lens 602 formed of binary optical elements 604, 606, 608, and 610, which may be in a ring configuration on a spherical lens, for example. Alternatively, the binary optical elements 604, 606, 608, and 610 may be in a cylindrical lens form, longitudinally extending into the illustration; By way of example, the binary optical elements may have step widths below 1 micron and step heights below 0.5 microns, with the binary optical element 604, 606, 608, and 610 having decreasing step widths.

FIG. 7 illustrates another example optical element 700 with an array of microlenses 702. The microlenses 702 may be formed on or separately mounted to a lower surface 704 of a grating layer 706, which may comprise a plurality of grating elements 708, such as those described herein. The microlenses 702 may allow for a smaller-sized optical module. Additionally, with a mircrolens 702 or a circular or elliptical diameter lens, in generally, a plurality of detectors may be used in a two-dimensional array format. This may allow for better spatial resolution of the collected optical radiation by the sensor. And it may allow for a pixel-based analysis of the radiation collected over different portions of the grating layer 706. Instead of being circular in shape, the microlenses may be made hexagonal, to allow closer packing of the array. Other shapes may be used as well.

Other lenses may be used, including aspherical lenses. Furthermore, while the lenses illustrated above may be used in a cylindrical form extending the length of an axis x, in a spherical form, or an elliptical form with different curvatures along major and minor axes.

Figure 8:
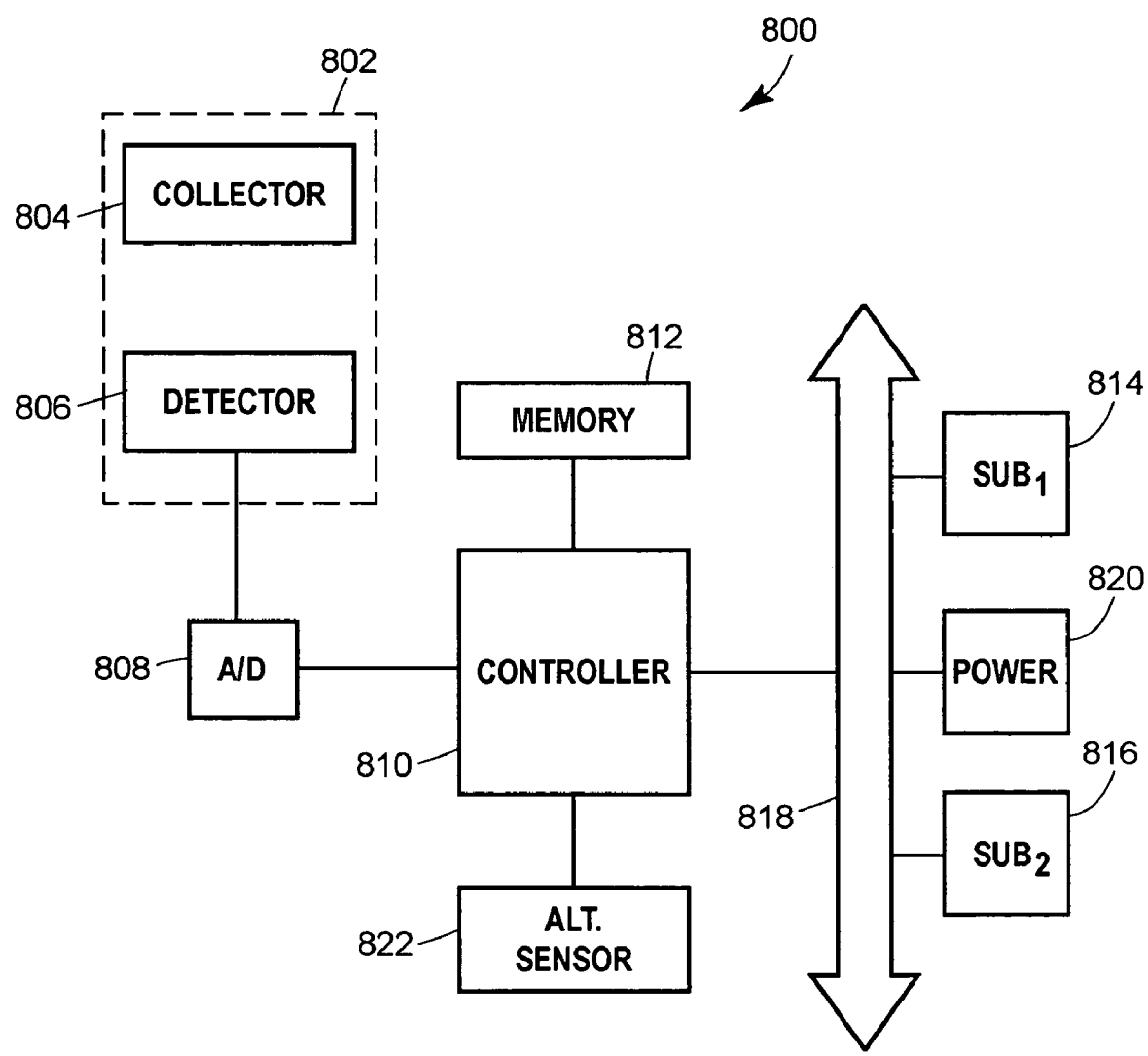
FIG. 8 illustrates a control system in which an optical sensor is used to control operation of an actuation-based sub-system, as might be used in an aircraft environment.

FIG. 8 illustrates an example control system 800 employing an optical sensor 802 to affect control of other systems, for example, actuator-based systems as might be used on an aircraft. The optical sensor 802 may be formed of a radiation collector 804, such as the grating layers described above, and a detector or detector array 806, such as those described above. The sensor 802 may be a component of a larger sensor application, such as multiple off-axis incidence sensors. The sensor 802 may be part of an apparatus capable of collecting light over a range of acceptance angles including substantially on-axis collection.

An output from the sensor 802 is coupled to a converter 808, for example, an analog-to-digital converter (ADC), filter, amplifier, or the like. The converter 808 is coupled to a controller 810, which may be a central processing unit or microprocessor capable of accessing memory storage 812, as shown. Example storage devices include volatile and non-volatile memory, random access memory (RAM), read only memory (ROM), cache memory, as well as, memory storage media, such as a hard drive, or a CD-ROM or DVD-ROM storage media.

In the illustrated example, the controller 810 controls operation of a plurality of subsystems, Sub1 814 and Sub2 816, in response to the data from the sensor 802. For example, if the detector 806 is an array detector, then the sensor 802 may provide the controller 810 with multi-dimensional data on the sensed radiation. The subsystems 814 and 816, shown by way of example, may represent actuator based subsystems that can convert control signals from the controller 810 into a mechanical actuation, such as those used in aircraft and flight applications. Thus, the single dimension or multi-dimensional data from the detector 806 may be used to control different subsystems of an aircraft, including guidance systems.

The controller 810 may provide control signals to the subsystems 814 and 816 via bus 818, such as a motherboard bus. The sub-systems 814 and 816 may be coupled directly to the bus or coupled thereto via known connections, including those compliant with the following standards or protocols substantially compliant therewith: Institute of Electronics and Electrical Engineers (IEEE) IEEE-1394b, Universal Serial Bus (USB) 1.1, USB 2.0, a Peripheral Component Interconnect (PCI) interface, or other interfacing standard. Additionally, although the subsystems 814 and 816 are shown coupled to a single power supply 820, in fact they may be driven by different power supplies. Additionally, in the illustrated example, the controller 810 is coupled to an optional second sensor 822 for example a sensor capable of measuring operating conditions, such as a temperature sensor. The sensor 822 may be coupled to the optical sensor 802 for sensing operating conditions within the sensor 822, for example.

Figure 9A:
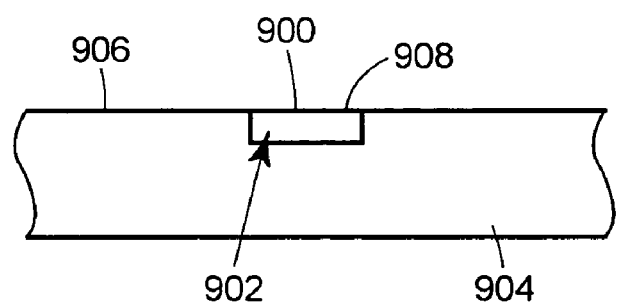
FIGS. 9A & 9B illustrate an example environment of use for a large angle of incidence optical element, such as those illustrated in FIGS. 4–7.
Figure 9B:
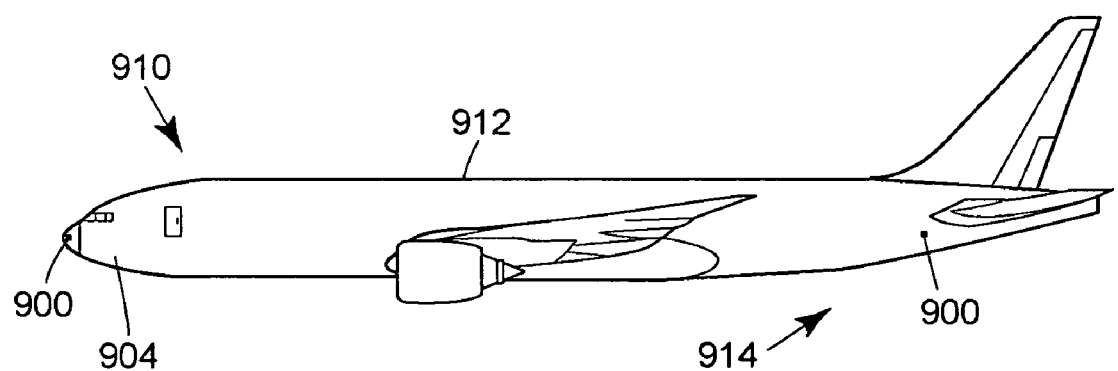

FIGS. 9A and 9B illustrate example applications of an optical sensor module, where an optical module 900 is disposed in a recess 902 of an exposed covering 904 (partially shown) that may represent a skin on an aircraft. The covering 904 may be have an exposed surface 906 that is flush with a top surface 908 of the optical module 900. The covering 904 may be conical in shape, for forming a nose cone of an aircraft or flight vehicle capable of sustaining high-speed flow conditions, including supersonic speeds. The optical module 900 may be sized and positioned to withstand such fluid flow conditions and still detect off-axis radiation. The module 900 may be positioned elsewhere on a covering, such as on a fuselage. FIG. 9B shows two modules 900 (not illustrated to scale), one disposed in the covering 904 at a nose end 910 of an aircraft 912, the other disposed in the covering 904 at an aft end 914 of the aircraft 912. Although in the illustrated example, the module 900 is flush with the adjacent outer surface 906, alternatively the module may extend above or below the surface 906 depending on the desired angular sensitivity range.

Numerous alternatives are possible. For example, although the optical elements are described for sensing applications, the detectors may be replaced with light sources such that the optical elements could be used as off-axis illumination devices. Expanding light sources would produce optical radiation collected by lenses that reflect the radiation into off-axis exit angles by a grating layer. Such devices may be useful for uniform illumination of certain areas, as sources of uniformly directed light. A strip of light emitting diodes (LED) may be used to generate a white light, for example, via a red, green, blue LED combination or an ultraviolet LED with a fluorescing material. The white light may then be directed to specific large deflection angle regions using optical elements as described herein. Applications include indoor and outdoor applications where light coverage is important.

Figure 10:
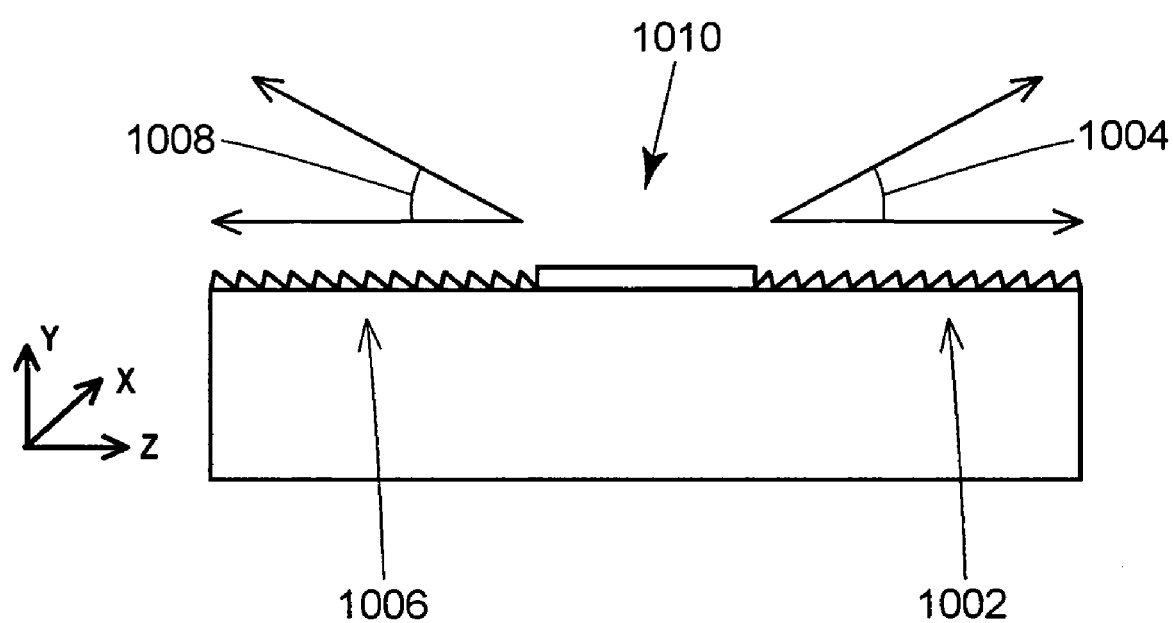
FIG. 10 illustrates another optical element in accordance with an example.
Figure 11A:
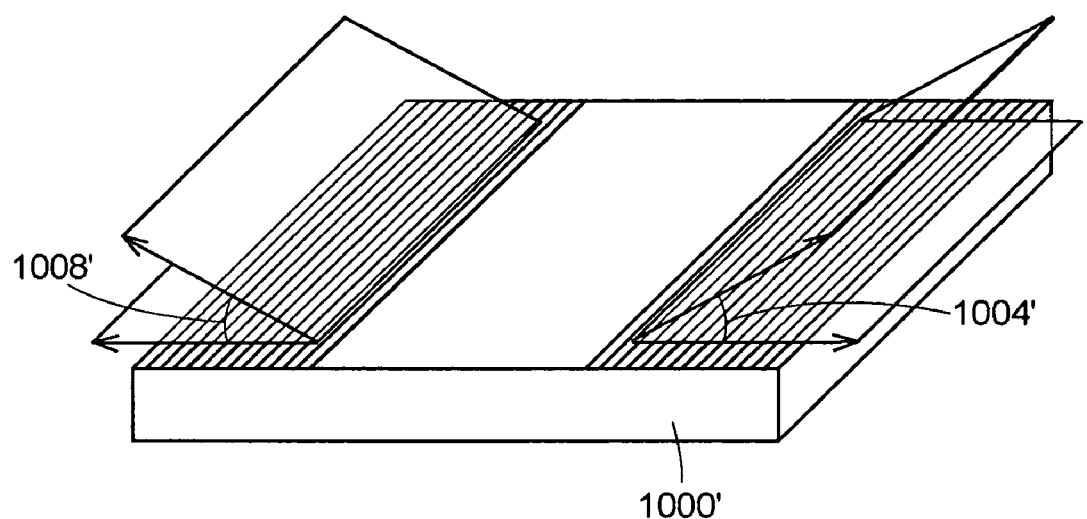
FIGS. 11A and 11B illustrate two different acceptance angle patterns for example optical elements.
Figure 11B:
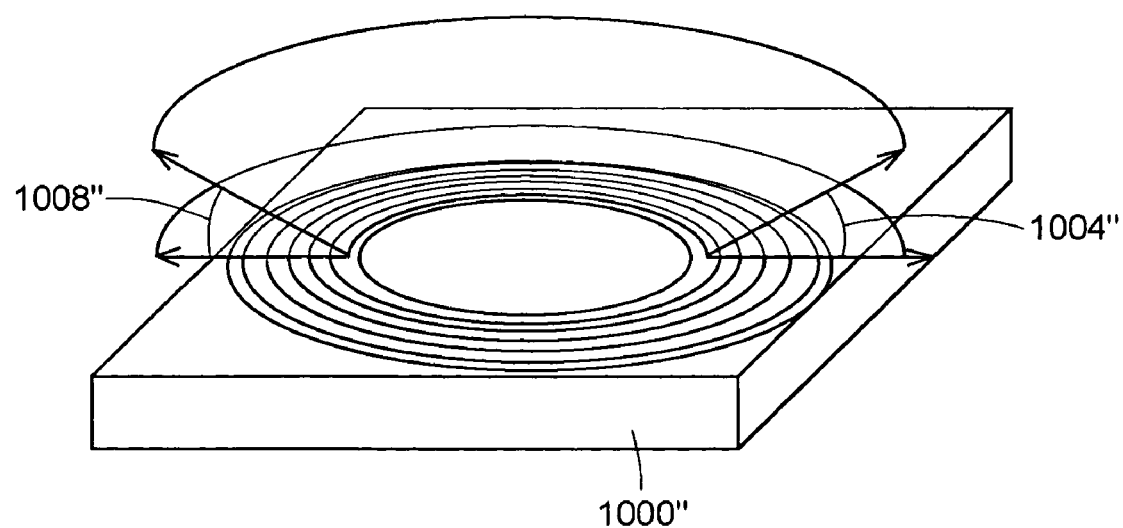

Further still, the illustrated examples collect light from a particular off-axis direction, but grating layers may be used to collect light from different off-axis directions. As shown in FIG. 10, a grating layer may be formed to collect light from opposing off-axis regions. A grating layer 1000 has a first grating region 1002 that may collect radiation over a first acceptance angle range 1004 and a second grating region 1006 that may collect radiation over a second acceptable angle range 1008. With similar geometries between regions 1002 and 1006, the ranges 1004 and 1008 may be identical. The ranges may be different, however, by adjusting the properties of the respective grating. The grating regions 1002 and 1006 may having grating elements that extend linearly along an x-axis, or they may represent different sides of a circular grating element, meaning that regions 1004 and 1008 are part of a cylindrical cone of acceptable angles. FIG. 11A illustrates an example of the former acceptance angle pattern, with regions 1004' and 1008' for a layer 1000'. FIG. 11B illustrates an example of the latter, with regions 1004" and 1008" for a layer 1000". In the illustrated example, the grating layer 1000 acts as an optical acceptance-angle filter via regions 1004 and 1008, and also has an central region 1010 that may be used to collect on-axis (y-axis) and substantially on-axis radiation, for example, via a planar window or lens.

Figure 12:
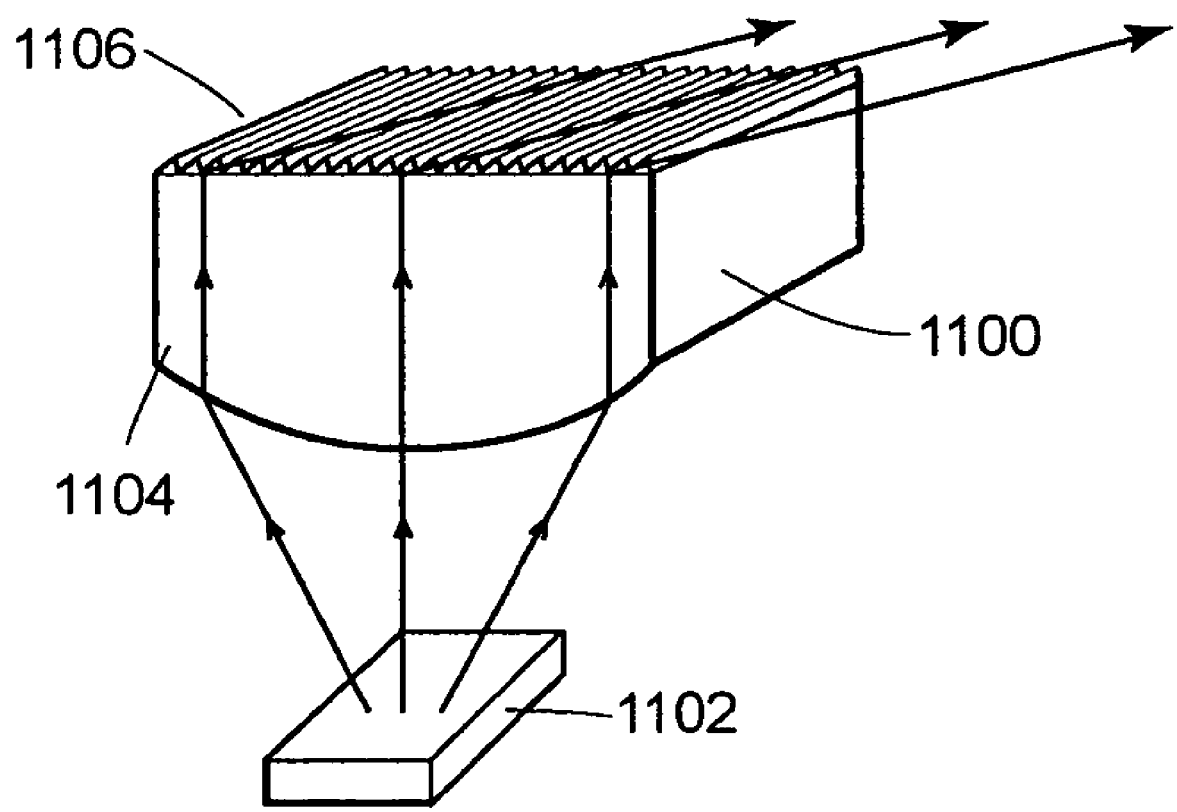
FIG. 12 illustrates an optical element used in an off-axis illumination device.

FIG. 12 illustrates another embodiment, where the optical path may be reversed by substituting a light source for the detector, or at the focal plane. An optical element 1100 that may be similar to the optical elements described above is coupled to receive light from the light source 1102, which may be light emitting diodes (LEDs), laser diodes, black body sources such as a filament or arc lamp, or other light source. In some examples, the light source 1102 is a side emitting or vertical cavity surface emitting laser. As light diverges from the light source, positioned at a focal length of the optical element 1100, the light is collected by a lens 1104 of the element 1100, which may produce a substantially normal and collimated light energy. The lens 110 may be, for example, a cylindrical lens, spherical lens, elliptical lens, Fresnel lens, or binary optical element lens.

The element 1100 has a grating layer 1106, similar to those described above, that has a reflection face and an exit face (not shown). The exit face provides off-axis radiation, as shown. Thus, optical radiation from the device 1100 may be at large angles from the surface normal of the element 1100. The radiation may exit the element 1100 at any angle in a range of off-axis angles, such as between about 45° and about 90°, as measured from a surface normal. This range is provided by way of example.

Specific color (wavelength range) effects may be obtained by using optical filters in conjunction with black body sources, or by using LEDs or laser diodes of a specific color, or in combination. In an example, the output from red, green and blue LEDs may be combined by the element 1100 to produce white light. That is, each of the LEDs may be positioned below the element 1100 in place of the light source 1102. Alternatively, white light LEDs that employ blue/UV radiation to excite a phosphor material analogous to a conventional fluorescent tube light may be used.

Examples are not limited to visible radiation, but apply to optical radiation at any wavelength for which a suitable combination of light source and optical grating material exist.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. An optical device comprising:
    a substantially planar grating layer formed of a plurality of grating elements, each grating element having an entrance face forming a first angle with a surface normal of the planar grating layer, the entrance face positioned for receiving off-axis radiation, and a reflection face forming a second angle with the surface normal and positioned to reflect the off-axis radiation in a direction substantially aligned with the surface normal and under total internal reflection;
    at least one lens for focusing the reflected off-axis radiation onto a focal plane; and
    at least one photo-detector positioned to receive the reflected light at the focal plane.

2. The optical device of claim 1, wherein the substantially planar grating layer and the at least one lens abut each other.

3. The optical device of claim 1, wherein the substantially planar grating layer and the at least one lens are formed of the same material.

4. The optical device of claim 1, wherein the substantially planar grating layer is formed of a material selected from the group consisting of zinc selenide, zinc sulfide, calcium fluoride, fused silica, sapphire, germanium, and gallium arsenide.

5. The optical device of claim 1, wherein the substantially planar grating layer is formed of a material selected from the group consisting of polycarbonate, acrylic, and polyethylene.

6. The optical device of claim 1, wherein the off-axis radiation forms an angle with the surface normal to the grating layer that is between about 45° and about 90°.

7. The optical device of claim 6, wherein the angle is between about 55° and about 85°.

8. The optical device of claim 1, further comprising a reflective layer disposed on an exposed side of the reflection face.

9. The optical device of claim 1, wherein the at least one lens comprises a cylindrical lens having a longitudinal axis parallel to a longitudinal axis of the plurality of grating elements.

10. The optical device of claim 1, wherein the at least one lens comprises a spherical lens.

11. The optical device of claim 1, wherein the at least one lens comprises an elliptical lens.

12. The optical device of claim 1, wherein the at least one lens comprises a Fresnel lens.

13. The optical device of claim 1, wherein the at least one lens comprises a binary optical element lens.

14. The optical device of claim 1, wherein the at least one photo-detector comprises an infrared detector.

15. The optical device of claim 14, further including a detector array comprising the at least one photo-detector.

16. The optical device of claim 14, wherein the infrared detector is formed of indium antimonide.

17. The optical device of claim 14, wherein the infrared detector is formed of mercury cadmium telluride.

18. The optical device of claim 1, wherein the reflection face is disposed to reflect the off-axis radiation more than 90°.

19. An optical element comprising:
    a substantially planar grating layer having a plurality of grating elements disposed to reflect radiation incident upon the grating layer at an off-axis angle of incidence into a substantially normal direction under total internal reflection; and
    a plurality of focusing elements aligned along the substantially normal direction for focusing the reflected radiation to a focal plane as a plurality of focused radiation beams.

20. The optical element of claim 19, wherein each of the plurality of grating elements comprises an entrance face and an internal reflection face, wherein the internal reflection face reflects the radiation incident upon the grating layer at the off-axis angle of incidence a reflection angle greater than 90°.

21. The optical element of claim 20, wherein the entrance face and internal reflection face are disposed to reflect radiation incident within, a range of off-axis angles of incidence into the substantially normal direction under total internal reflection.

22. The optical element of claim 19, wherein the off-axis angle of incidence is greater than about 45°.

23. The optical element of claim 19, wherein the focusing element is a convex lens.

24. The optical element of claim 19, wherein the focusing element is a Fresnel lens or a binary-optical element lens.

25. The optical element of claim 19, wherein the plurality of focusing elements comprise an array of focusing elements.

26. An optical module comprising:
    a housing having an outer surface;
    an optical element disposed within the housing, the optical element comprising a substantially planar grating layer disposed adjacent the outer surface and having a plurality of grating elements disposed to reflect radiation incident upon the grating layer at an off-axis angle of incidence into a substantially normal direction under total internal reflection, and the optical element having at least one focusing element aligned along the substantially normal direction for focusing the reflected radiation to a focal plane; and
    at least one photodetector disposed within the housing to detect radiation of the focal plane.

27. The optical module of claim 26, wherein the at least one photodetector comprises an array of photodetectors.

28. For use in a vehicle capable of flight, an apparatus comprising:
    an exposed skin defining a recess; and
    an optical module disposed within the recess of the exposed skin for detecting radiation over an off-axis range of incident angles, as measured from an axis defined by the exposed skin, the optical element having a plurality of grating elements disposed to reflect radiation incident upon the grating layer at an off-axis angle of incidence into a substantially normal direction under total internal reflection, and the optical element having at least one focusing element aligned along the substantially normal direction for focusing the reflected radiation to a focal plane.

29. A method of sensing radiation at an off-axis angle of incidence, the method comprising:

forming a plurality of grating elements having an entrance face and an internal reflection face, wherein the entrance face accepts radiation at the off-axis angle of incidence and wherein the internal reflection face reflects the radiation in a direction substantially aligned with a surface normal and under total internal reflection;

focusing the reflected radiation onto a focal plane; and detecting radiation at the focal plane.

30. The method of claim 29, further comprising forming the plurality of grating elements to reflect radiation incident at an angle of between about 85° and about 55°, as measured from the surface normal.

31. The method of claim 29, further comprising:

disposing a plurality of lenses to focus the reflected radiation to different locations on the focal plane; and disposing a plurality of detectors at the different locations.

32. The method of claim 31, wherein the lenses are spherical lenses.

33. The method of claim 31, wherein the lenses are elliptical lenses.

34. The method of claim 31, wherein the lenses are Fresnel lenses.

35. The method of claim 30, wherein the lenses are binary optical element lenses.

36. The method of claim 29, wherein the detector is an infrared detector.

37. The method of claim 36, wherein the infrared detector is formed of indium antimonide.

38. The method of claim 36, wherein the infrared detector is formed of mercury cadmium telluride.

39. The method of claim 29, further comprising reflecting the radiation more than 90°.

40. An illumination device comprising:

a light source producing a light energy;

a lens positioned to collect the light energy and provide a substantially normal light energy; and a substantially planar grating layer positioned to receive the collected light energy, the substantially planar grating formed of a plurality of grating elements, each grating element having a reflection face forming a first angle with a surface normal of the planar grating layer and positioned to reflect the substantially normal light energy under total internal reflection onto an exit face forming a second angle with the surface normal, wherein the exit face is positioned to provide off-axis radiation.

41. The illumination device of claim 40, wherein the light source is a light emitting diode.

42. The illumination device of claim 40, wherein the light source is a laser source.

43. The illumination device of claim 40, wherein the substantially planar grating layer and the lens are formed of the same material.

44. The illumination device of claim 40, wherein the substantially planar grating layer is formed of a material selected from the group consisting of zinc selenide, zinc sulfide, calcium fluoride, fused silica, sapphire, germanium, and gallium arsenide.

45. The illumination device of claim 40, wherein the substantially planar grating layer is formed of a material selected from the group consisting of polycarbonate, acrylic, and polyethylene.

46. The illumination device of claim 40, wherein the off-axis radiation forms an angle with the surface normal to the grating layer that is between about 45° and about 90°.

47. The illumination device of claim 46, wherein the angle is between about 55° and about 85°.

48. The illumination device of claim 40, wherein the lens comprises a cylindrical lens having a longitudinal axis parallel to a longitudinal axis of the plurality of grating elements.

49. The illumination device of claim 40, wherein the lens comprises a spherical lens.

50. The illumination device of claim 40, wherein the lens comprises an elliptical lens.

51. The illumination device of claim 40, wherein the lens comprises a Fresnel lens.

52. The illumination device of claim 40, wherein the lens comprises a binary optical element lens.

53. The illumination device of claim 40, wherein the reflection face is disposed to reflect the substantially normal light energy more than 90°.

54. A method of providing radiation at an off-axis angle of incidence, the method comprising:

providing a light source producing a light energy;

collecting the light energy;

propagating the light energy in a substantially normal direction;

disposing a plurality of grating elements to receive the light propagating in the substantially normal direction, each grating element having an internal reflection face that reflects the light propagating in the substantially normal direction under total internal reflection, and each grating element having an exit face for producing radiation at the off-axis angle of incidence.

55. The method of claim 54, further comprising disposing the plurality of grating elements to reflect radiation incident at an angle of between about 85° and about 55°, as measured from a surface normal.

56. The method of claim 54, further comprising disposing a spherical lens to collect the light energy.

57. The method of claim 54, further comprising disposing an elliptical lens to collect the light energy.

58. The method of claim 54, further comprising disposing a Fresnel lens to collect the light energy.

59. The method of claim 54, further comprising disposing a binary optical element lens to collect the light energy.

60. The method of claim 54, further comprising reflecting the light propagating in a substantially normal direction greater than 90°.

* * * * *